United States Patent
Srinivasan et al.

(10) Patent No.: US 12,406,007 B2
(45) Date of Patent: Sep. 2, 2025

(54) MULTI-RECORD PROJECTION SEARCH PLATFORM

(71) Applicant: Yext, Inc., New York, NY (US)

(72) Inventors: Deepak Srinivasan, Ashburn, VA (US); Nathan Thillairajah, Washington, DC (US)

(73) Assignee: YEXT, INC., New York, NY (US)

(*) Notice: Subject to any disclaimer, the term of this patent is extended or adjusted under 35 U.S.C. 154(b) by 40 days.

(21) Appl. No.: 17/697,514

(22) Filed: Mar. 17, 2022

(65) Prior Publication Data
US 2023/0297623 A1 Sep. 21, 2023

(51) Int. Cl.
*G06F 16/9038* (2019.01)
*G06F 16/901* (2019.01)
*G06F 16/903* (2019.01)
*G06F 21/36* (2013.01)

(52) U.S. Cl.
CPC ...... *G06F 16/9038* (2019.01); *G06F 16/9024* (2019.01); *G06F 16/90335* (2019.01); *G06F 21/36* (2013.01)

(58) Field of Classification Search
CPC .......... G06F 16/9038; G06F 16/90335; G06F 16/9024; G06F 16/212; G06F 16/2452; G06F 16/252; G06F 16/951; G06F 16/532; G06F 16/832; G06F 21/36
See application file for complete search history.

(56) References Cited

U.S. PATENT DOCUMENTS

| | | | |
|---|---|---|---|
| 10,078,668 B1 | 9/2018 | Woodrow | |
| 10,353,956 B2* | 7/2019 | Fort | G06F 16/215 |
| 10,810,210 B2* | 10/2020 | Choudhury | G06F 16/2379 |
| 10,977,222 B1* | 4/2021 | Esman | G06F 16/211 |
| 11,210,341 B1* | 12/2021 | Bhagat | G06F 16/90335 |
| 2016/0283574 A1 | 9/2016 | Anderson | |
| 2017/0053357 A1 | 2/2017 | Bowman | |
| 2018/0019867 A1* | 1/2018 | Davis | H04L 63/104 |
| 2018/0232402 A1* | 8/2018 | Bhatti | G06F 16/9024 |
| 2019/0236194 A1* | 8/2019 | James | G06F 16/24542 |
| 2019/0251205 A1 | 8/2019 | Su | |
| 2020/0004864 A1* | 1/2020 | Hussam | G06F 16/438 |
| 2020/0125590 A1* | 4/2020 | Ferrentino | G06F 16/245 |
| 2020/0226156 A1 | 7/2020 | Borra | |

(Continued)

OTHER PUBLICATIONS

PCT Notification of Transmittal Of The International Search Report And The Written Opinion Of The International Searching Authority for PCT Application No. PCT/US2023/012475, mailed May 9, 2023, 16 pages.

*Primary Examiner* — Marcin R Filipczyk
(74) *Attorney, Agent, or Firm* — Jeffri A. Kaminski; Venable LLP

(57) ABSTRACT

A system and method to generate search results. The system and method receive a search query from an end-user system. In view of the search query, a first data record storing first data associated with a merchant system is identified. Based on a set of values of a projected field of the first data record, a second data record storing second data associated with the merchant system and a third data record storing third data associated with the merchant system are identified. A graphical user interface including a search result responsive to the search query is generated, the search results including at least the first data, the second data, and the third data.

17 Claims, 8 Drawing Sheets

(56) References Cited

U.S. PATENT DOCUMENTS

| | | | |
|---|---|---|---|
| 2021/0034625 A1* | 2/2021 | Shah | G06F 16/248 |
| 2021/0248202 A1* | 8/2021 | Box | G06F 16/90332 |
| 2021/0294792 A1 | 9/2021 | Sanshwe | |
| 2022/0164679 A1* | 5/2022 | Taylor | G06F 16/90332 |

* cited by examiner

FIGURE 3

| C_entityReference<br><br>Base identifier: c_entityReference<br>Property Names: []<br>Is this an entity reference: True — 312 | C_structField.substruct.entityList — 314<br><br>Base identifier: c_structField<br>Property Names: [substruct, entityList]<br>Is this an entity reference: True |
|---|---|
| name — 316<br><br>Base identifier: name<br>Property Names: []<br>Is this an entity reference: False | c_structField.textList<br><br>Base identifier: c_structField<br>Property Names: [textList]<br>Is this an entity reference: False — 318 |

```
"verticals": {
  "doctors": {
    "searchablefields": {
      "name": {...},
      "address": {...},
      "specialty.name": {...},
      "specialty.synonyms": {...},
      "specialty.relatedconditions.name": {...},
      "specialty.relatedconditions.synonyms": {...}
    }
  },
  "entityTypes": ["healthcareProfessional"]
}
```
— 510

MULTI-RECORD PROJECTION SEARCH PLATFORM

TECHNICAL FIELD

Embodiments of the present disclosure relate generally to a knowledge search platform. In particular, embodiments of the present disclosure relate to a search platform including multiple records that are configurable related to one another as searchable projections to enable the generation of comprehensive search results.

BACKGROUND

Many companies (e.g., merchants) employ electronic systems to provide information to consumers. For example, a web-based search system may generate and return search results related to a search query received from an end-user system (e.g., smartphone, laptop, tablet, etc.). In this regard, the end users may use a search engine to obtain merchant-related information that is published and accessible via a network (e.g., the Internet). Search engines are software programs that search databases to collect and display information related to search terms specified by an end user.

To provide accurate and comprehensive search results to end users, the data associated with a merchant system needs to be managed and maintained. In order to serve optimized search results associated with a merchant system in response to a search query from an end user, data maintained in a variety of different records stored in one or more data stores may need to be identified.

For example, a healthcare provider may wish to provide end-user systems with a search experience that enables the generation of accurate and comprehensive search results. The taxonomy associated with healthcare related information allows searching against medical conditions and specialties that are mapped merchant system-related listings categories. The taxonomy is managed via a file upload system in an employee-only user interface of the merchant system. However, the taxonomy is globally defined, such that it is not configured or configurable on a per-merchant system basis.

In addition, a taxonomy update requires a wholesale update of all affected data records associated with a merchant system (e.g., data records having field values associated with any of the categories in the taxonomy). This often results in a taxonomy update that causes updates for a large portion of merchant systems that are indexed in the search platform. Moreover, the process for changing the global taxonomy may include the uploading of a single comma separated value (CSV) file containing all mappings, which does not allow for the configurability of individual mappings directly within the search platform.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 3 illustrates an example schema including an example subset of fields associated with data corresponding to a merchant system to be processed by a search management system, in accordance with one or more embodiments of the present disclosure.

FIG. 5 illustrates an example data structure including a configuration associated with an example data record including data associated with a merchant system, in accordance with one or more embodiments of the present disclosure.

DETAILED DESCRIPTION

Figure 1:
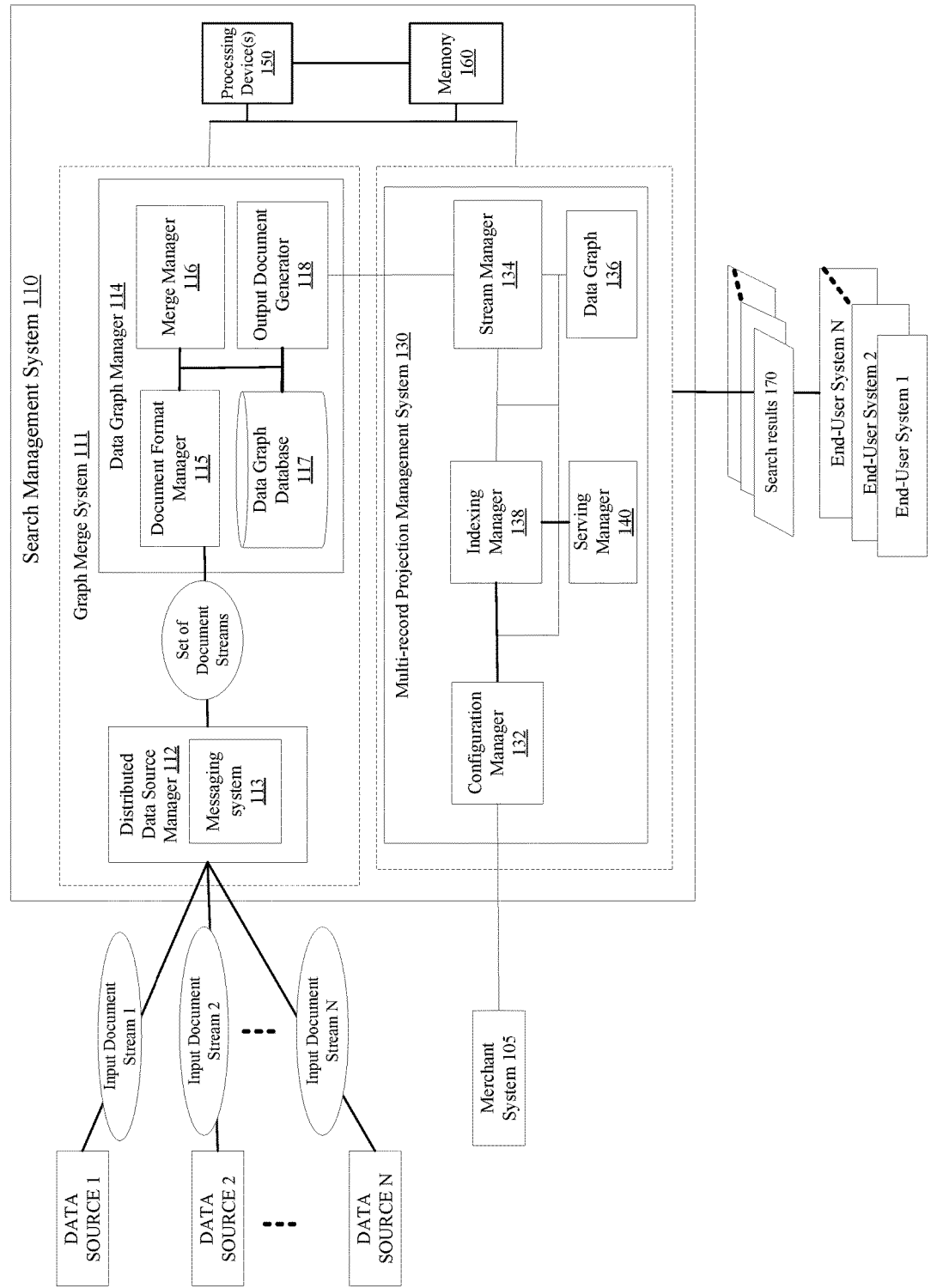
FIG. 1 illustrates an example of a computing environment including a search management system to generate search results in response to a search query received from an end-user system, in accordance with one or more embodiments of the present disclosure.

The present application relates to methods and systems to provide a search platform including indexed and searchable data records including data relating to a merchant system. The data records (also referred to as "entity records" or "entities") each include a collection of fields storing data associated with a merchant system that can be identified and provisioned as part of a search result set in response to a search query received from an end-user system. In an embodiment, the methods and systems (also referred to as a "search management system") enables a merchant system to add and update data (also referred to as a merchant system data) that is searchable to provide a search result in response to a search query. The merchant system data can be stored in the individual entity records or entities and indexed to render the stored data searchable in response to search queries submitted by one or more end-user systems.

In an embodiment, the search management system includes an indexing manager to establish an indexing pipeline that consumes data from a data graph database associated with the merchant system. The data graph (also referred to as a "knowledge graph") includes a collection of entity records storing data associated with a merchant system. The respective entity records can have one or more fields and corresponding data that are configured as searchable (e.g., fields that can be searched against in response to a search query). Advantageously, the fields of the respective entity records can be configured to identify a type of search that can be performed against each respective individual field. For example, a first field of a first entity record can be configured to be searchable in view of a first type of search, a second field of the first entity record can be configured to be searchable in view of a second type of search, and so on.

Example search types include, but are not limited to, a natural language processing (NLP) search type, text search type (e.g., a keyword search), a document snippet extraction search type, etc.

According to a further advantage, multiple entity records can be related to one another to enable information stored in the data records to be surfaced as part of a search result set in response to a search query. The relationship or projection between a series of entity records can be established to enable multiple "hops" or "projections" between the set of multiple data records, such that the two data records can be linked for purposes of indexing and searching to provide as part of a search result in response to a search query. In an embodiment, a merchant system can configure a first entity record to have a relationship or projection with multiple other entity records. In response to a search query, upon identification of the first entity record as relevant to the search results, the multiple projections to the other entity records can be used to identify those entity records for generating the search results 170 to be served to the end-user system 170 in response to the search query. Advantageously, a multi-record projection or multi-hop projection can be used to enable the searching of multiple entity records that are linked or associated by configuring the respective projection between the multiple entity records.

FIG. 1 illustrates an example computing environment 100 including a search management system 110 communicatively connected to one or more data sources (e.g., data source 1, data source 2 . . . data source N) and one or more end-user systems (e.g., end-user system 1, end-user system 2 . . . end-user system X). The search management system 110 generates and serves search results 170 including data associated with a merchant system 105 to the one or more end-user systems in response to search queries associated with the merchant system 105.

Figure 2:
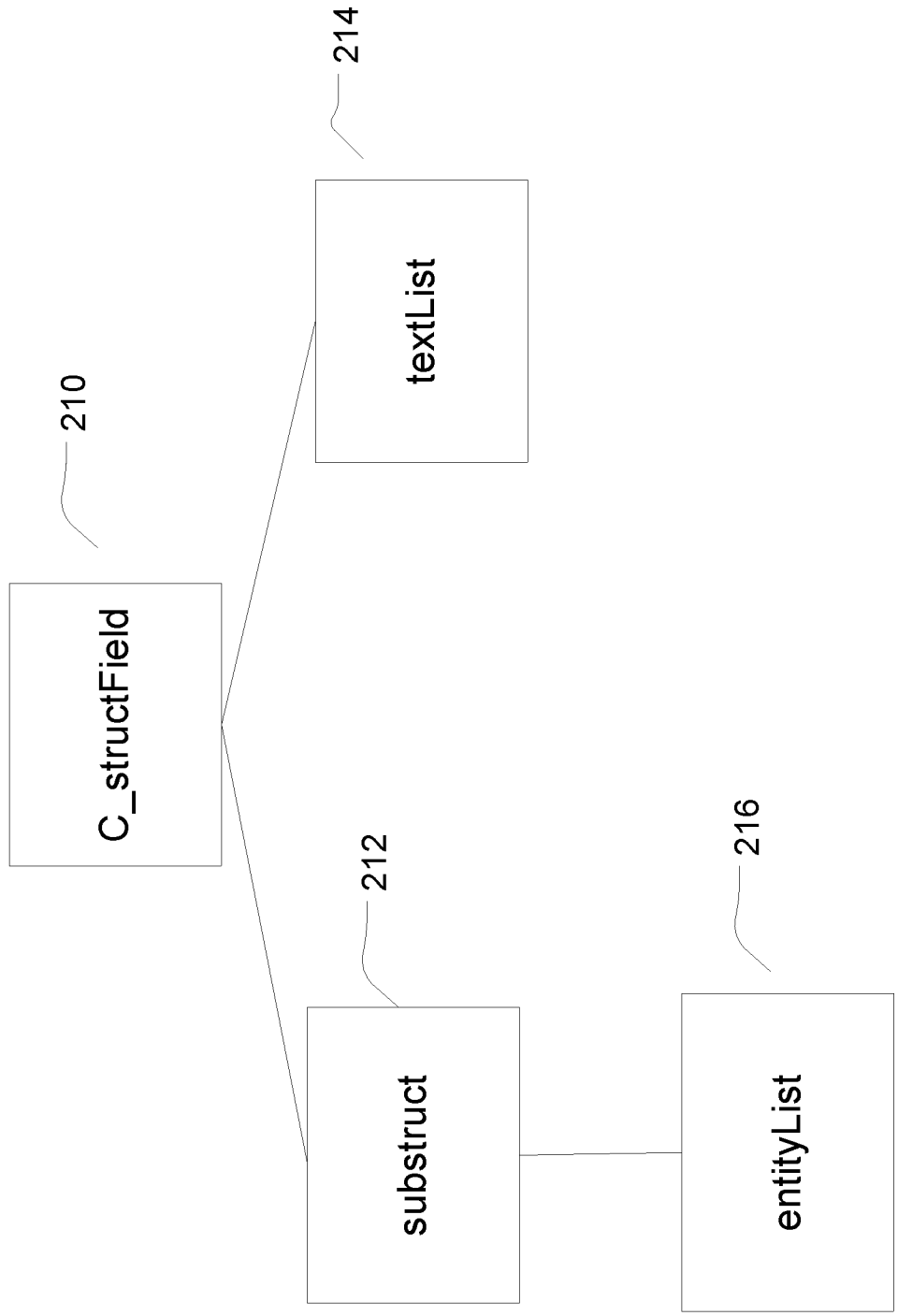
FIG. 2 illustrates an example data structure of an entity record managed by a search management system to generate search results in response to a search query, in accordance with one or more embodiments of the present disclosure.

The search management system 110 generates the search results 170 including data associated with the merchant system 105 that is identified using multiple entity records of the merchant system 105 stored in a data graph 136 corresponding to the merchant system 105, as described in greater detail below with reference to FIGS. 1-3. In an embodiment, the user systems may be any suitable computing device (e.g., a server, a desktop computer, a laptop computer, a mobile device, etc.) associated with a user (e.g., a company) associated with a website including one or more web pages generated by the search management system 110. The search management system 110 may be communicatively connected to the user systems via a suitable network. In an embodiment, the search management system 110 may be accessible and executable on one or more separate computing devices (e.g., servers).

According to embodiments, the search management system 110 can include one or more software and/or hardware modules to perform the operations, functions, and features described herein in detail, including a graph merge system 111 and a multi-record projection management system 130 to enable the use of data streams (e.g., streams of documents) managed and generated by the graph merge system 111 to generate an indexed data graph 136 including multiple entity records corresponding to a merchant system 105 and generate search results based on multi-record projections between sets of related entity records. In an embodiment, the graph merge system 111 and multi-record projection management system 130 are operatively coupled to one or more processing devices 150 and one or more memory devices 160 (e.g., memory devices to store instructions executable by the one or more processing devices 150) to perform the operations and functions described herein. In one embodiment, the components or modules of the search management system 110 may be executed on one or more computer platforms of a system associated with an entity that are interconnected by one or more networks, which may include a wide area network, wireless local area network, a local area network, the Internet, etc. The components or modules of the search management system 110 may be, for example, a hardware component, circuitry, dedicated logic, programmable logic, microcode, etc., that may be implemented in the processing device of the knowledge search system.

In an embodiment, the search management system 110 includes the graph merge system 111 to manage user knowledge graphs (e.g., data graph 136) based on the input data streams from the disparate data sources and generates output document streams (also referred to as "streams") for use by the web page generation and update manager 130 in generating web pages 170. The generation of the streams and processing of the streams by the stream manager 134 of the web page generation and update manager 130 are described in greater detail below.

In an embodiment, the stream manager 134 manages streams received from a streaming system (e.g., the graph merge system 111) which provides entity records to the multi-record projection management system 130. In an embodiment, the graph merge system 111 generates a published output document stream in accordance with schemas established by each of the user systems. The published output document stream includes multiple documents (e.g., having multiple document types) that are formatted in accordance with the user-system schema to enable the output of data to the end-user systems (e.g., in response to a search query from an end-user system). In an embodiment, document types can include, but are not limited to, an entity type (e.g., a document including data associated with an entity (e.g., a person, a store location, etc.) associated with the user system, a listings type (e.g., a document including data associated with a review associated with a user system), and a review type (e.g., a document including data relating to a review associated with a user system).

In an embodiment, the graph merge system 111 can transmit a file including a dataset associated with a published output document stream to a user system on a periodic basis. In an embodiment, the graph merge system 111 can send a notification to a user system, where the notification is associated with an update to the published output document stream. According to embodiments, the graph merge system 111 may be communicatively coupled to a user system via any suitable interface or protocol, such as, for example, application programming interfaces (APIs), a web browser, JavaScript, etc. In an embodiment, the graph merge system 111 is coupled to the memory 160 which stores instructions executable by the one or more processing devices 150 to perform the instructions to execute the operations, features, and functionality described in detail with respect to the graph merge system 111.)

As shown in FIG. 1, the graph merge system 111 is communicatively connected to one or more data sources (e.g., data source 1, data source 2 . . . data source N) and one or more user systems (e.g., user system 1, user system 2 . . . user system X). The graph merge system 111 provides a distributed data graph (also referred to as a "data graph" "knowledge graph" or "user data graph") publishing platform. The graph merge system 111 receives input document streams (e.g., input document stream 1, input document stream 2 . . . input document stream N) from the one or more data sources. The graph merge system 111 merges the data of the multiple input document streams into a corresponding user data graph for the respective user systems (e.g., user system 1, user system 2 . . . user system N) that is persisted in a database (e.g., data graph database 117) of the graph merge system 111. For example, the user systems may be any suitable computing device (e.g., a server, a desktop computer, a laptop computer, a mobile device, etc.) associated with a user system (e.g., a company) associated with a data graph managed and maintained by the graph merge system 111.

According to embodiments, the graph merge system 111 manages the user knowledge graphs based on the input data streams from the disparate data sources and generates output document streams for publication to the respective user systems for provisioning to one or more end-user systems (not shown). As used herein, the term "end-user" refers to one or more users operating an electronic device (e.g., end-user system 1) to submit a request for data (e.g., a web page request, a search query, etc.) to a user system (e.g., user system 1, user system 2 . . . user system X).

In an embodiment, the graph merge system 111 generates a published output document stream in accordance with schemas established by each of the user systems. The published output document stream includes multiple documents (e.g., having multiple document types) that are formatted in accordance with the user-system schema to enable the output of data to the end-user systems (e.g., in response to a search query from an end-user system). In an embodiment, document types can include, but are not limited to, an entity type (e.g., a document including data associated with an entity (e.g., a person, a store location, etc.) associated with the user system, a listings type (e.g., a document including data associated with a review associated with a user system), and a review type (e.g., a document including data relating to a review associated with a user system).

The graph merge system 111 may be communicatively connected to the user systems via a suitable network. In an embodiment, the graph merge system 111 may be accessible and executable on one or more separate computing devices (e.g., servers). In an embodiment, the graph merge system 111 can transmit a file including a dataset associated with a published output document stream to a user system on a periodic basis. In an embodiment, the graph merge system 111 can send a notification to a user system, where the notification is associated with an update to the published output document stream. According to embodiments, the graph merge system 111 may be communicatively coupled to a user system via any suitable interface or protocol, such as, for example, application programming interfaces (APIs), a web browser, JavaScript, etc.

According to embodiments, the graph merge system 111 can include one or more software and/or hardware modules to perform the operations, functions, and features described herein in detail, including a distributed data source manager 112 including a messaging system 113, a data graph manager 114 including a document format manager 115, a merge manager 116, a data graph database 117, and a output document generator 118, the one or more processing devices 150, and the one or more memory devices 160. In one embodiment, the components or modules of the graph merge system 111 may be executed on one or more computer platforms of a system associated with an entity that are interconnected by one or more networks, which may include a wide area network, wireless local area network, a local area network, the Internet, etc. The components or modules of the graph merge system 111 may be, for example, a hardware component, circuitry, dedicated logic, programmable logic, microcode, etc., that may be implemented in the processing device of the knowledge search system.

In an embodiment, the distributed data source manager 112 includes a messaging system 113 configured to receive input document streams from multiple data sources (e.g., data source 1, data source 2 . . . data source N). The input document streams include one or more document messages including one or more documents (e.g., a file or other data object that can be electronically transmitted and stored) including data relating to a user system having a data graph managed by the data graph manager 114 of the graph merge system 111. In an embodiment, the messaging system 113 may include a messaging layer configured to read one or more document messages of the input document streams received from the multiple data sources (e.g., data sources such as a software as a service (SAAS) platform, Google™, Yelp™, Facebook™ Bing™, Apple™, Salesforce™, Shopify™, Magento™, a user system (e.g., a source of data relating to a user system that is managed and maintained by the user system), or and other search service providers). In an embodiment, one or more messaging channels are established with the respective data sources to enable transmission of the document messages of the input document streams that are received and processed by the distributed data source manager 112 of the graph merge system 111.

In an embodiment, the messaging system 113 can be configured to receive input document streams from one or more suitable messaging platforms. For example, the messaging system 113 can be configured to interact with a publish-subscribe based messaging system configured to exchange data between processes, application, and servers (e.g., the Apache Kafka® distributed streaming platform). In an embodiment, the messaging system 113 is configured to interact with a publish and subscribe based messaging system to receive the document input streams. In an embodiment, the messaging system 113 is configured to receive document input streams from one or more clusters of servers of the messaging system. In an embodiment, a cluster of the messaging system is configured to store streams of document messages organized or grouped according to a parameter (e.g., a topic), where each document message is associated with identifying information (e.g., a key, a value, and a timestamp). In an embodiment, a topic is used to identify a persistent queue of documents. In an embodiment, a topic identifies documents that are produced by the graph database and are to be processed by the search management system 110. In an embodiment, the topic can be a category or document stream feed name to which document messages (or records) are published. A topic can include a category used to organize messages, where each topic has a name that is unique across a cluster. Messages can be sent to and read from specific topics, where producers write data to topics, and consumers read data from topics.

In an embodiment, the messaging system 113 can include a listener module configured to listen for document updates in the multiple data sources. In an embodiment, the messaging system 113 can be configured to process the document messages in any suitable fashion, including processing the messages from one or more message queues in a serial manner, processing updates incrementally (e.g., in batches of documents at predetermined time intervals), etc.

In an embodiment, the distributed data source manager 112 is configured to provide an interface to the data graph manager 114 via which the documents streams (e.g., a set of document streams corresponding to the input document streams received from the data sources). are transmitted. In an embodiment, the distributed data source manager 112 is configured to adapt the documents received from the data sources to the set of document streams including document records containing data updates or information identifying document records to be deleted. In an embodiment, the distributed data source manager 112 can refresh the data from the data sources to identify data updates and synchronize the document streams following a configuration change. In an embodiment, the distributed data source manager 112 can maintain and apply a set of stream rules that identify one or more fields of the documents that are to be monitored for purposes of transmitting to the data graph manager 114 for further processing. In an embodiment, example fields include, but are not limited to, a name field, a project field, a source field, a type field, an account field, a subaccount field, a filter field, a label field, etc. In an embodiment, the distributed data source manager 112 applies the stream rules to identify a set of data from the documents corresponding to at least the fields identified by the one or more stream rules.

In an embodiment, the document format manager 115 of the data graph manager 114 can perform one or more input transformation functions with respect to the document messages received from the multiple data sources. In an embodiment, the document format manager 115 maintains and applies one or more input transform functions representing instructions regarding processing of an incoming document message according to one or more transformation definitions (e.g., a default transformation definition, a transformation corresponding to an arbitrary data-interchange format that provides an organized, human-readable structure (e.g., a JSON transformation), etc.). In an embodiment, the input transformation function can include a defined schema for formatting the data included in the document message received via the input document streams. The transformed document messages (e.g., the result of the input transformation function) establish a uniform or defined input schema (e.g., organized set of fields and corresponding data values) for further processing by the data graph manager 114.

In an embodiment, the merge manager 116 receives the set of transformed document streams (provided by the multiple different data sources) and merges the multiple streams of documents for incorporation into a corresponding user data graph stored in a data graph database 117. In an embodiment, the data graph manager 114 merges the data of the transformed input document into the corresponding nodes of the user data graph. In an embodiment, the input data document received from a data source (e.g., in a format defined by the data source) is parsed to enable transformation into the transformed document schema where each document includes one or more graph key properties which identify a corresponding node or relationship in a user data graph. In an embodiment, the one or more graph key properties provide information to identify a graph node in accordance with one or more attributes (e.g., an authority attribute identifying who is responsible for the key, a stability attribute enabling older systems to refer to newer data, a uniqueness context attribute, an opacity attribute, etc.).

In an embodiment, the data graph manager 114 performs the merge function by fetching an existing document graph node corresponding to the identified graph key. In an embodiment, the input document can be parsed or broken down into multiple different components such as a set of one or more field-values that are to be updated, a set of one or more graph edges to create or update corresponding to reference-type values, and metadata corresponding to the data source of the document message. In an embodiment, the data graph manager 114 uses the parsed or identified portions of the document message to generate or update a graph node to merge the data into the data graph associated with a user system (e.g., an entity). Additional details relating to the streaming system are provided in U.S. patent application Ser. No. 17/167,631, filed Feb. 4, 2021, the entirety of which is incorporated by reference herein.

In an embodiment, the streams are generated by the graph merge system 111 and provided to the stream manager 134 for processing in the generation of search results 170 by the multi-record projection management system 130. In an embodiment, the generated streams are supplied to the stream manager 134 by the output document generator 118 for use in the generation of multi-record projection based search results 170 in response to a search query received from an end-user system (e.g., end-user system 1, end-user system 2 . . . end-user system N of FIG. 1). According to embodiments, the graph merge system 111 manages and maintains a data graph corresponding to the data associated with each respective merchant system (e.g., merchant system 105), also referred to as the respective knowledge graphs 136 corresponding to the merchant system 105, as described in greater detail below.

In an embodiment, the data graph can be stored in the data graph database 117 and again in the multi-record projection management system 130 for easy reprocessing, such that if a new deploy is requested for the same stream, this data can be pulled from the data graph 136 of the multi-record projection management system 130, instead of reprocessing the data through the stream manager 134 from the initial sources. In an embodiment, the initial data is provided as part of one or more streams by the stream manager 134 to the serving manager 140. The serving manager 140 uses the streamed data to generate search results including data from one or more entity records identified in view of one or more multi-hop projections.

In an embodiment, the multi-record projection management system 130 can include one or more software and/or hardware modules to perform the operations, functions, and features described herein in detail, including a configuration manager 132, a stream manager 134, an indexing module 138, and a serving module 140 to establish an indexed set of entity records stored in the data graph 136 that are searchable in response to a search query to generate search results based on multi-record projections between sets of related entity records. In an embodiment, the multi-record projection management system 130 generates multiple entity records that have configured projections to establish relationships between the multiple entity records to enable multiple hops between the entity records to formulate optimized search results including data from the multiple entity record in response to a search query.

In an embodiment, the configuration manager 132 is communicatively coupled to the merchant system 105 and provides an interface to enable the processing of configurations of the entity records stored in the data graph 136 associated with the merchant system 105. In an embodiment, via a suitable interface, the merchant system 105 can submit information to the configuration manager 132 to configure a set of entity records associated with the merchant system 105. In an embodiment, the merchant system 105 can configure a search experience by modifying one or more fields of an entity record to designate one or more types of searches that can be performed against the respective field. For example, the configuration manager 132 can be used to configure a first field of a first entity record to be searchable via a first search type (e.g., a NLP search type). In another example, the configuration manager 132 can be used to configure a second field of a first entity record to be searchable via a second search type (e.g., a text or keyword search type). In an embodiment, the configuration manager 132 includes code that is executed to handle and manage configuration updates and validation.

In an embodiment, the indexing manager 138 enables the indexing of the entity records associated with the merchant system 105. The indexing manager 138 can receive and process additional entity records, additional data associated with existing entity records, and updated data associated with entity records that can be retrieved and indexed such that the data is searchable. The indexing manager 138 consumes data from the data graph 136 managed by the stream manager 134, converts the data into an indexed and searchable format, and stores the searchable data to create an indexing pipeline associated with the merchant system 105.

In an embodiment, the stream manager 134 ingests data from the graph merge system 111 and the ingested data is used by the indexing manager 138 to index the data to enable searching against field values of an entity record that is linked, associated or projected from another entity record. In an embodiment, an entity record can be configured as a "secondary entity" or "secondary entity record" that is linked to a "primary entity" or "primary entity record" (e.g., the entity record that is identified for inclusion or return as part of a search result in response to a search query). In an embodiment, a field of the secondary entity (herein the "entity reference field") can be configured to establish a link or projection with the primary entity. In an embodiment, the entity reference field of the secondary entity can identify one or more other entities (e.g., a primary entity) between which there is a projection that can cause a "hop" to associated entities during the searching of the entities to produce a corresponding search result.

In an embodiment, the multi-entity projection manager 130 can enable multiple "hops" or projections between multiple entities by establishing and managing a "multi-hop" or "multi-record" field identifier to an indexed entity record. The multi-hop field identifier is configured such that it is indexed and searchable to identify one or more related projections in response to a search query. In an embodiment, the multi-hop field identifier can be configured to support projections of multiple hops (e.g., three hops) by combining multiple entity reference fields and a leaf field, which is a field having a value that is being searched against. In an example, the multi-hop field identifier can include the following value that is a projection combining three entity reference fields and a leaf field: c_entityRef1.c_entityRef2.c_entityRef3.c_Keywords). In this example, entity references 1, 2, and 3 and leaf field Keywords are associated in view of the value of the multi-hop field identifier.

In an embodiment, the serving manager 140 enables the processing of a search query from an end-user system and the searching of the indexed entity records to generate search results 170 to serve to the end-user system. Advantageously, the search results served to the end-user system in response to a search query can include data results from multi-record or multi-hop projections via configurable fields of the entity records storing data associated with the merchant system 105.

In an embodiment, the multi-record projection management system 130 enables support for the multi-record projections in the indexing pipeline managed by the indexing manager 138 by storing the entity reference field values and corresponding data for each entity record. In an embodiment, the serving manager 140 is configured to search against the newly indexed entity reference values and execute calls into the stream manager 134 to return these values on their fully rendered entity profiles. In an embodiment, the multi-record projection management system 130 enables the projected field identifiers to be configurable by a merchant system 105 via the configuration manager 132.

In an embodiment, the multi-record projection management system 130 executes a search management process to enable the indexing, serving, and configuration features of the present disclosure by segmenting or splitting up a projected multi-hop field identifier into individual components or "hops". While segmenting a projected multi-hop field identifier appears to involve separating the field identifier based on a delimiter (e.g., the period character), the search management system 110 allows for specification of a "struct" data type (i.e., a set of struct type fields) that represent a complex structured query language (SQL) data type that model a data record. In an embodiment, the struct data type includes struct type fields that have sub-properties, where the sub-properties are one of a subfield or a sub-struct.

In an embodiment, a single field can have an arbitrarily complex sub-structure. For example, as shown in FIG. 2, the multi-record projection management system 130 may maintain a data structure including a first struct type field called "c_structField" 210 having two sub-properties: "substruct" 212 (i.e., another struct type field) and "textList" 214 (i.e., a leaf field). In the example shown in FIG. 2, the sub-struct property field 212 can have a subfield called "entityList" 216, which is an entity reference leaf field.

In an embodiment, the multi-record projection management system 130 identifies and employs schema information associated with the fields in an account associated with the respective merchant system 105. The merchant system schema (also referred to as an "account schema" or "schema") is used to properly separate the projected field identifiers into its constituent components or sub-components.

FIG. 3 illustrates an example merchant system schema 310 including an example subset of fields (312, 314, 316, and 318) associated with data corresponding to a merchant system (e.g., merchant system 105 of FIG. 1). As shown in FIG. 3, the example account schema 310 and respective subset of fields includes a first field 312 labeled "c_entityReference" having a base identifier of "c_entityReference", a null set for "property names" and a value of "true" indicating the field is an entity reference. The schema 310 includes a second field 314 labeled "c_structField.substruct.entityList" having a base identifier of "c_structField", property name values of "substruct" and "entityList", and a value of "true" indicating the field is an entity reference. The schema 310 shown in FIG. 3 also includes a third field 316 labeled "name" having a base identifier of "name", a null set for "property names", and a value of "false" indicating the field is not an entity reference. The schema 310 includes a fourth field 318 labeled "c_structField.textList" having a base identifier of "c_structField", a property name value of "textList", and a value of "false" indicating the field is not an entity reference.

Figure 4:
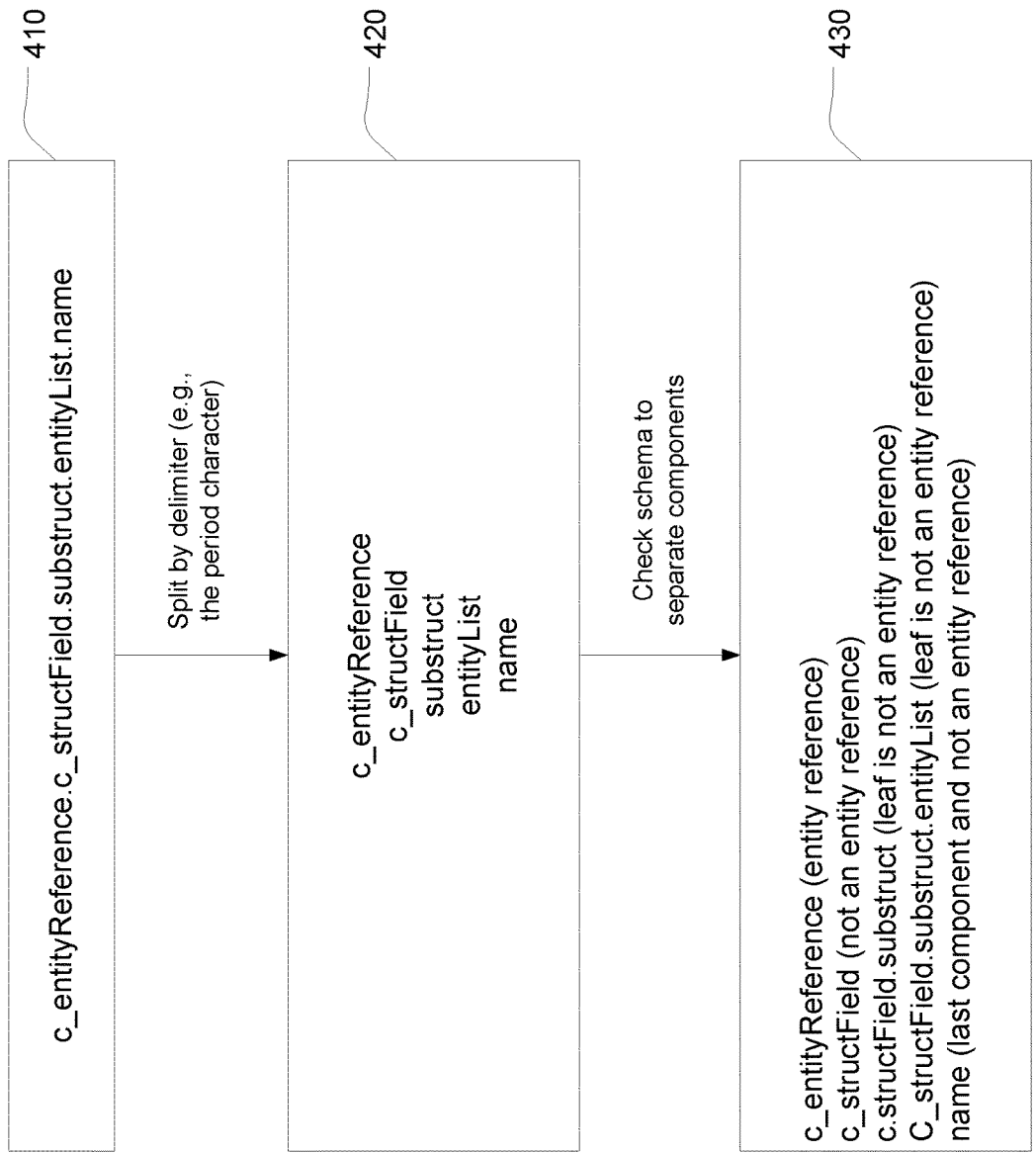
FIG. 4 illustrates an example schema field resolution process executable by a search management system to use a merchant system-related schema to identify and segment a projected field identifier into respective components and a valid list of fields, in accordance with one or more embodiments of the present disclosure.

In an embodiment, the multi-record projection management system 130 executes a schema field resolution process to use the account schema to identify and segment the respective components into a valid list of fields. FIG. 4 illustrates execution of an example schema field resolution process by the multi-record projection management system 130, as applied to the example fields shown in FIG. 3. As shown in FIG. 4, in a first operation, an example projected field identifier "c_entityReference.c_structField.substruct.entityList.name" 410 is identified and split or segmented by a delimiter (e.g., the period character). Based on the splitting operation based on the delimiter (e.g., the period character), the projected field identifier 410 is split or segmented to identify a list of fields 420. The list of fields 420 includes a first field ("c_entityReference), a second field ("c_structField"), a third field ("substruct"), a third field ("entityList"), and a fourth field ("name").

In an embodiment, the multi-record projection management system 130 uses the schema to recursively identify the components and generate a valid list of fields 430. In an embodiment, the multi-record projection management system 130 identifies the applicable schema and applies it to the list of fields 420 to generate the valid list of fields and corresponding designations of entity reference fields and non-entity reference fields. As shown in the example in FIG. 4, the multi-record projection management system 130 uses the schema to identify the "c_entityReference" field and the "c_structField.substruct.entityList" field as entity reference fields.

In an embodiment, the data streams managed by the streams manager 134 may be used as a data source for the indexing process executed by the indexing manager 138. In an embodiment, the indexing manager 138 is configured to store values of the multi-hop projection fields and enable those fields to be searchable. In an embodiment, when a data value changes in an entity record associated with a merchant system, a message is sent by the stream manager 134 which indicates the data has been updated. Consequently, if a value changes on an entity record that has been mapped to through a multi-hop projected field ID in the merchant system's configuration, the update message is generated and received for the "parent" entity record that includes information about the projected field. The field information can be used to construct the full projected field ID, and the field identifier is stored to the indexing manager 138 to enable subsequent searching against the data of the fields associated with the projected field identifier.

In an embodiment, the indexing manager 138 is configured to handle multi-hop projections involving option type fields and boolean (yes/no) fields. Specifically, for boolean fields, the indexing manager 138 indexes a field's display name as the value when it is set to "true" on a particular entity record. The field name corresponding to a "yes/no" field (e.g., a field named "Accepts Reservations") provides useful information when searching, as compared to the actual value of "Yes" or "No".

In an embodiment, the indexing manager 138 manages option-type fields by using an identifier corresponding to a value set on the entity reference to look up the actual display value, enabling the indexing of the value for search purposes. In an embodiment, when the indexing manager 138 encounters a multi-hop projection involving either a field value type or an option type, the schema field resolution process is executed to split a projected field identifier (e.g., projected field identifier 410 of FIG. 4) into corresponding components. Once the identifier has been split into components, the leaf component (i.e., the final component of the projected field identifier representing the actual field whose value is searched against) is used to retrieve display information.

In an embodiment, the serving manager 140 resolves projected field identifiers that were enabled for searching via the configuration manager 132, in order to properly retrieve schema information for these fields. In an embodiment, the serving manager 140 uses the schema field resolution process after identifying and pulling down the merchant system-specific schema for application to the projected field identifier.

In an embodiment, after a query is issued to the stream manager 134 to retrieve entity record results based on the search query received from an end-user system, the serving manager 140 issues a call to an application programming interface (API) that returns entity records (e.g., data records associated with the merchant system stored in the data graph 136) to return entity data in the search results response. In an embodiment, the data associated with a selected set of fields of the entity records stored in the data graph 136 are indexed. The selected set of fields correspond to those fields that are selected (e.g., by the merchant system 105) to be eligible to be searched (e.g., searchable fields designated by the merchant system 105 via the configuration manager 132) for a particular search type (e.g., an "answers" search type which returns search results in response to a search query having a question and answer type format). Advantageously, in an embodiment, not all of the data associated with all of the fields in the data graph is indexed. In an embodiment, a merchant system 105 may elect to use the value(s) for a field on an entity result that is not eligible to be searched on in response to a search query having a particular search type (e.g., an "answers" search type).

In an embodiment, to support the use of the data streams managed by the streams manager 134 as a data source for the indexing process executed by the indexing manager 138, the serving manager 140 is configured to call an API associated with the stream manager 134 (also referred to as the "streams API") in order to return entity record data. In an embodiment, the call to the streams API enables support for multi-hop projections since the streams API is configured to support specifying and returning projected field identifiers and corresponding values.

In an embodiment, the serving manager 140 is configured to call into the appropriate data streams API endpoint(s) (e.g., by entity record type) for each vertical of the data graph to render entity results. In an embodiment, each data graph vertical may be associated with multiple entity types, resulting in the serving manager 140 making multiple calls per data stream API endpoint. In an embodiment, the data streams API may return an enumeration identifier (e.g., a set of named integer constants) instead of display names for option values when fetching profiles. In order to return the actual display names for option values as part of the API response the stored option value display names may be used to enable post-processing of the JavaScript Object Notation (JSON) formatted value to replace the enum identifiers with the display names for option fields. In an embodiment, in addition to normal leaf option fields, the serving manager 140 supported projected option fields (e.g., c_entityReference.c_optionField) by using the schema field resolution process and fetching display information for the leaf field.

In an embodiment, the configuration manager 132 enables the projected fields to be searchable. The configuration manager 132 can generate a graphical user interface (GUI) for use by the merchant system 105 to input and select configurations to support the new field identifiers of the projected fields as searchable via the search management system 110. In an embodiment, the GUI (also referred to as the "configuration interface") can be JSON editor that can be used by the merchant system to enable searching on the projected fields.

In an embodiment, the configuration manager 132 can use leaf entity reference field information to allow projected field identifiers in a configuration. The schema field resolution process can be executed to verify whether the components of a field identifier can be pieced together to form a valid projected field API name. After the field identifiers are separated into their individual components, the whole field identifier can be verified to confirm it is valid. In an embodiment, the validation logic allows projected field identifiers to be added for all merchant system accounts, and it is limited to the accounts that are indexed with data streams.

FIG. 5 illustrates a data structure including an example configuration 510 corresponding to an example vertical (e.g., a "doctors" vertical) including multi-hop projection functionality, according to embodiments of the present disclosure. Note that the example configuration includes standard field IDs: "name", "address", as well as projected field IDs: "specialty.name", "specialty.synonyms", "specialty.relatedconditions.name", and "specialty.relatedconditions.synonyms". The configuration specifies that entities of type "healthcareProfessional" (e.g. doctors) should be returned based on the search query. The projected field ID of "specialty.relatedconditions.synonyms" is comprised of three separate components: Specialty (an entity reference field that links to Specialty entities), Related Conditions (an entity reference field that links to Condition entities), and Synonyms (a searchable text field, referred to as the "leaf" field). In this example, if an end-user system submits a search query for "broken arm", the search management system 110 uses the configuration to identify all of the doctors in the vertical that specialize in a medical field that may treat "broken arm".

Figure 6:
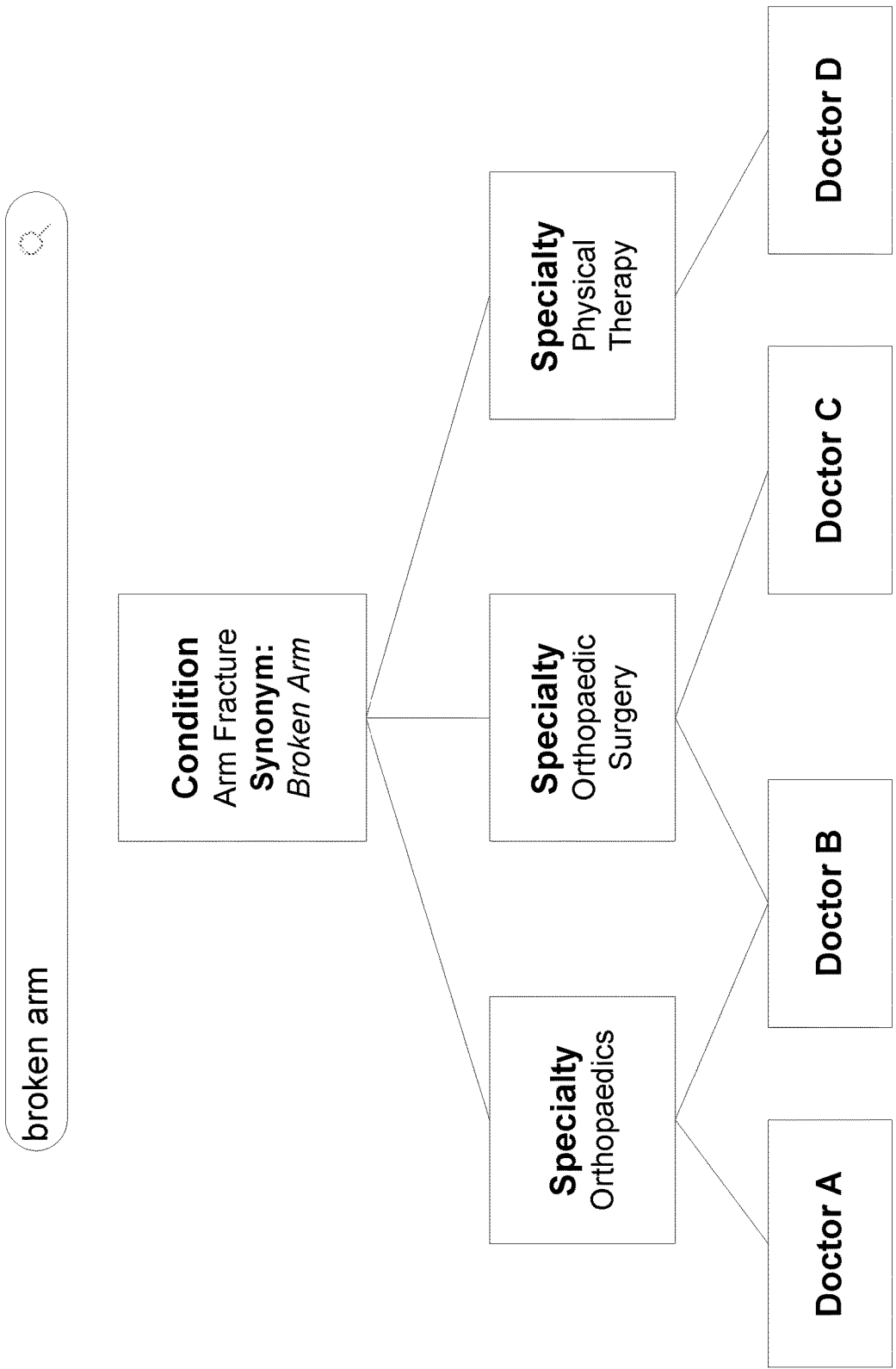
FIG. 6 illustrates an example search query and corresponding search results identified in accordance with a multi-record projection process executed by a search management system, in accordance with one or more embodiments of the present disclosure.

FIG. 6 illustrates an example search query 610 including a search query input (e.g., "broken arm") that is processed by the search management system 110 to generate search results based on one or more multi-record projections. As shown in FIG. 6, a first term ("arm fracture) of a first entity record (i.e., an entity record that has a value of "arm fracture" set for the "Condition" field. In an embodiment, the search management system 110 identifies that the search query term "broken arm" is listed as a synonym in the "arm fracture" entity record and, therefore, a match between the search query and the first entity record is identified.

The "arm fracture" condition entity record is related to three specialties—orthopedics, orthopedic surgery, and physical therapy. Accordingly, the search result generation process is executed to identify doctor entity records associated with any of these specialties. In this example, Doctor A is identified as specializing in orthopedics, Doctor B is identified as specializing in both orthopedics and orthopedic surgery, Doctor C is identified as specializing in orthopedic surgery, and Doctor D is identified as specializing in physical therapy. Therefore, all four of these doctors would be returned for the query of "broken arm"—this is because all four doctors are linked to various specialties, which are in turn lined to the condition of "arm fracture", which has a synonym of "broken arm".

Figure 7:
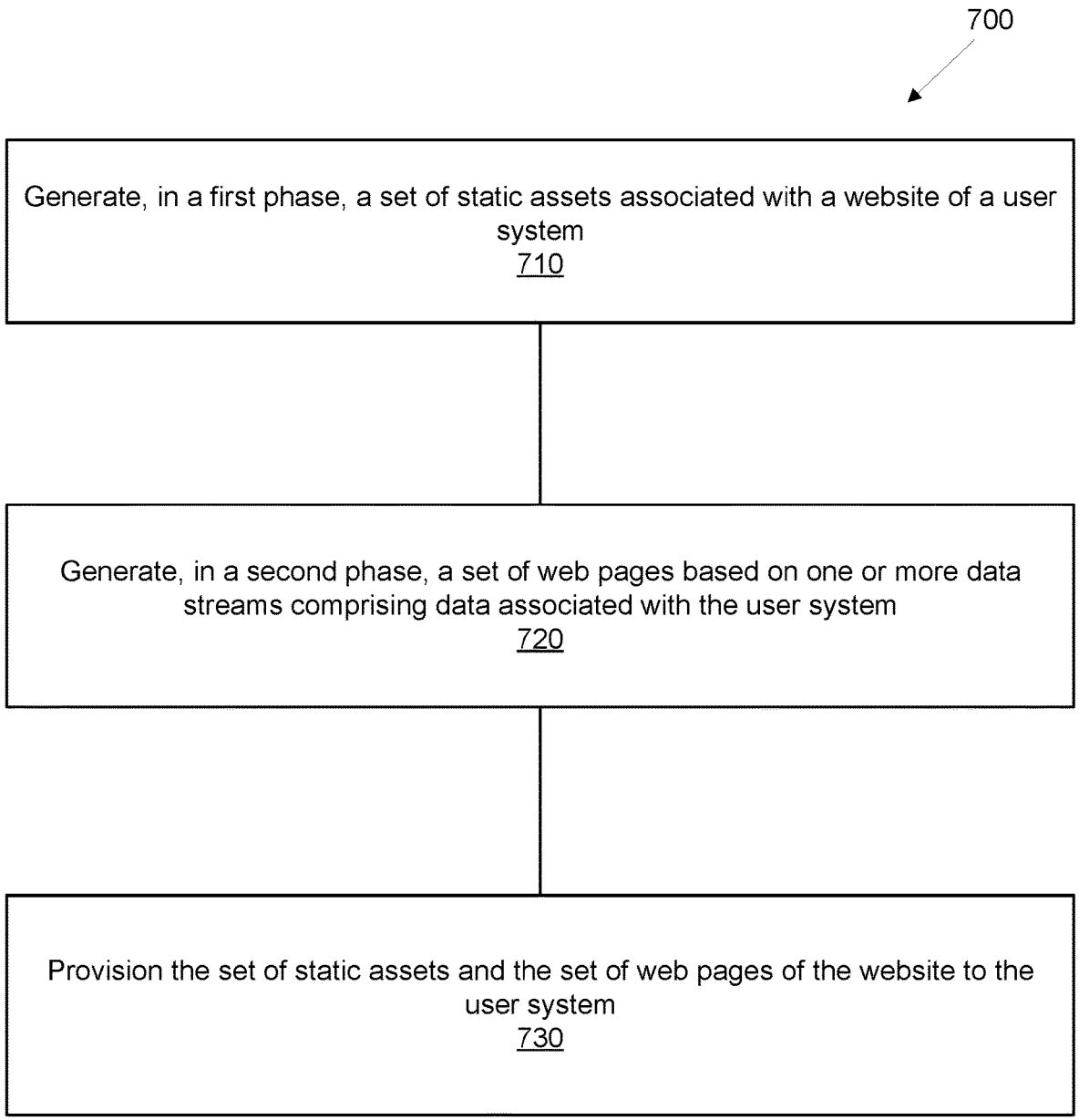
FIG. 7 illustrates an example method to generate search results in response to a search query, the search results including data associated with a merchant system identified using multi-record projection processing, in accordance with one or more embodiments of the present disclosure.

FIG. 7 illustrates a flow diagram relating to an example method 700 including operations performed by a search management system (e.g., search management system 110 of FIG. 1), according to embodiments of the present disclosure. It is to be understood that the flowchart of FIG. 7 provides an example of the many different types of functional arrangements that may be employed to implement operations and functions performed by one or more modules of the search management system as described herein. Method 700 may be performed by a processing logic that may comprise hardware (e.g., circuitry, dedicated logic, programmable logic, microcode, etc.), software (e.g., instructions run on a processing device), or a combination thereof. In one embodiment, the search management system executes the method 600 to generate, in response to a search query, a set of search results based on data corresponding to entity record identified using multi-record or multi-hop projection processing.

In operation 710, the processing logic receives a search query from an end user system. In an embodiment, the search query input relates to data associated with a merchant system. In an embodiment, the search query can include one or more keywords, terms, or phrases that can be processed according to a search algorithm to identify one or more entity records including data that may be included in a search result returned to the end-user system.

In operation 720, the processing logic identifies, in view of the search query, a first data record storing first data associated with a merchant system. In an embodiment, the first data record is identified from the knowledge graph associated with the merchant system in response to the execution of a search algorithm. The first data record includes a set of fields and values corresponding to one or more keywords that satisfy the applicable search criteria associated with the executed search algorithm.

In operation 730, the processing logic identifies, based on a set of values of a projected field of the first data record, a second data record storing second data associated with the merchant system and a third data record storing third data associated with the merchant system. In an embodiment, the processing logic executes the search algorithm against the values of the projected field to identify the second data record and the third data record. In an embodiment, the values of the projected field enable the processing logic to perform a multi-record or multi-hop projection to identify the second data record and the third data record as being relevant to the search query in view of the projection or relationship with the identified first data record.

In operation 740, the processing logic generates a graphical user interface including a search result responsive to the search query, the search results including at least the first data, the second data, and the third data. In an embodiment, the search results can be displayed via the graphical user interface according to any suitable format, layout, presentation or structure. Advantageously, the projected field, which can be configured by the merchant system, can be used to identify multiple related or projected data records associated with the initial or first data record identified by execution of the search algorithm.

Figure 8:
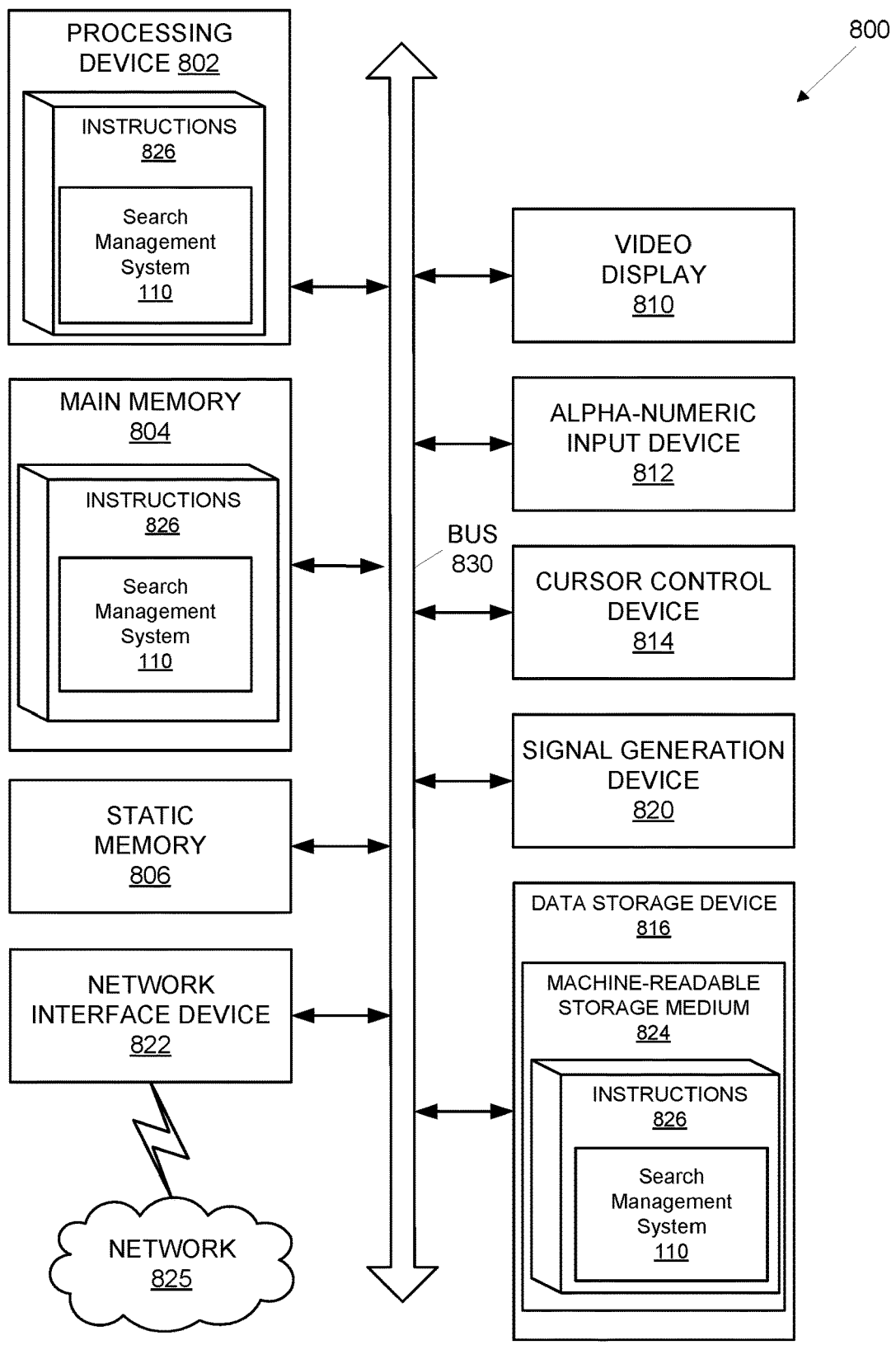
FIG. 8 illustrates an example computer system operating in accordance with one or more embodiments of the present disclosure.

FIG. 8 illustrates an example computer system operating in accordance with some implementations. FIG. 8 illustrates an example computer system 800 operating in accordance with some embodiments of the disclosure. In FIG. 8, a diagrammatic representation of a machine is shown in the exemplary form of the computer system 800 within which a set of instructions, for causing the machine to perform any one or more of the methodologies discussed herein, may be executed. In alternative embodiments, the machine 800 may be connected (e.g., networked) to other machines in a local area network (LAN), an intranet, an extranet, or the Internet. The machine 800 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 800. Further, while only a single machine is illustrated, the term "machine" shall also be taken to include any collection of machines that individually or jointly execute a set (or multiple sets) of instructions to perform any one or more of the methodologies discussed herein.

The example computer system 800 may comprise a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 816), which may communicate with each other via a bus 830. Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

Processing device 802 may also be one or more special-purpose processing devices such as an application specific integrated circuit (ASIC), a field programmable gate array (FPGA), a digital signal processor (DSP), network processor, or the like. Processing device 802 is configured to execute a search term management system for performing the operations and steps discussed herein. For example, the processing device 802 may be configured to execute instructions implementing the processes and methods described herein, for supporting a search term management system, in accordance with one or more embodiments of the present disclosure.

Example computer system 800 may further comprise a network interface device 822 that may be communicatively coupled to a network 825. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 820 (e.g., a speaker).

Data storage device 816 may include a computer-readable storage medium (or more specifically a non-transitory computer-readable storage medium) 824 on which is stored one or more sets of executable instructions 826. In accordance with one or more embodiments of the present disclosure, executable instructions 826 may comprise executable instructions encoding various functions of the search management system 110 in accordance with one or more embodiments of the present disclosure.

Executable instructions 826 may also reside, completely or at least partially, within main memory 804 and/or within processing device 802 during execution thereof by example computer system 800, main memory 804 and processing device 802 also constituting computer-readable storage media. Executable instructions 826 may further be transmitted or received over a network via network interface device 822.

While computer-readable storage medium 824 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating," "receiving," "transforming," "provisioning," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer implemented method comprising:
receiving a search query from an end-user system;
identifying, in view of the search query, a first data record storing first data associated with a merchant system, wherein the first data record comprises a projected field associated with a multi-record field identifier, wherein the multi-record field identifier comprises multiple entity reference fields and a leaf field, and wherein the multi-record field identifier is configured to support projections of multiple hops by combining the multiple entity reference fields and the leaf field;
identifying, based on the multi-record field identifier, the multiple hops associated with the first data record in response to the search query;
executing a projected field resolution process to segment the multi-record field identifier into a set of components in accordance with a schema associated with the merchant system, wherein each component of the set of components corresponds to a data field of a data record, the segmenting including specifying a struct data type such that the multi-record field identifier includes a set of struct type fields, the struct data type including a subfield and representing a complex structured query language data type that models a data record;
identifying, by a processing device executing a search algorithm against the data value of a leaf component corresponding to the leaf field of the first data record, a second data record and a third data record, wherein the second data record and the third data record are part of a search result in response to the search query based on the multiple hops associated with the first data record; and
generating a graphical user interface including the search result, the search results including data values corresponding to the first data record, the second data record and the third data record.

2. The method of claim 1, further comprising receiving, from the merchant system, the schema corresponding to one or more data records associated with the merchant system.

3. The method of claim 1, wherein the projected field resolution process comprises splitting the multi-record field identifier of the projected field into a list of fields using a delimiter in accordance with the schema.

4. The method of claim 1, further comprising:
receiving, from the merchant system, a first indication of a search type to associate with the projected field;
determining the search query corresponds to the search type; and
searching the projected field in view of the search query.

5. The method of claim 1, further comprising:
identifying one or more data streams comprises updated data associated with the first data record;
receiving an additional search query; and
generating an updated search result based on the one or more data streams comprising the updated data associated with the first data record.

6. The method of claim 1, wherein segmenting the multi-record field identifier into a set of components comprises splitting the multi-record field identifier by the search management system.

7. A system comprising:
a memory to store instructions; and
a processing device, operatively coupled to the memory, to execute the instructions to perform operations comprising:
receiving a search query from an end-user system;
identifying, in view of the search query, a first data record storing first data associated with a merchant system, wherein the first data record comprises a projected field associated with a multi-record field identifier, wherein the multi-record field identifier comprises multiple entity reference fields and a leaf field, and wherein the multi-record field identifier is configured to support projections of multiple hops by combining the multiple entity reference fields and the leaf field;
identifying, based on the multi-record field identifier, the multiple hops associated with the first data record in response to the search query;
executing a projected field resolution process to segment the multi-record field identifier into a set of components in accordance with a schema associated with the merchant system, wherein each component of the set of components corresponds to a data field of a data record, the segmenting including specifying a struct data type such that the multi-record field identifier includes a set of struct type fields, the struct data type including a subfield and representing a complex structured query language data type that models a data record;
identifying, by the processing device executing a search algorithm against the data value of a leaf component corresponding to the leaf field of the first data record, a second data record and a third data record, wherein the second data record and the third data record are part of a search result in response to the search query based on the multiple hops associated with the first data record; and
generating a graphical user interface including the search results, the search results including data values corresponding to the first data record, the second data record and the third data record.

8. The system of claim 7, the operations further comprising receiving, from the merchant system, the schema corresponding to one or more data records associated with the merchant system.

9. The system of claim 7, wherein the projected field resolution process comprises splitting the multi-record field identifier of the projected field into a list of fields using a delimiter in accordance with the schema.

10. The system of claim 7, the operations further comprising:
receiving, from the merchant system, a first indication of a search type to associate with the projected field;
determining the search query corresponds to the search type; and
searching the projected field in view of the search query.

11. The system of claim 10, the operations further comprising:
identifying one or more data streams comprises updated data associated with the first data record;
receiving an additional search query; and
generating an updated search result based on the one or more data streams comprising the updated data associated with the first data record.

12. The system of claim 7, wherein segmenting the multi-record field identifier into a set of components comprises splitting the multi-record field identifier by the search management system.

13. A non-transitory computer readable storage medium comprising instructions that, when executed by a processing device, cause the processing device to perform operations comprising:

receiving a search query from an end-user system;

identifying, in view of the search query, a first data record storing first data associated with a merchant system, wherein the first data record comprises a projected field associated with a multi-record field identifier, wherein the multi-record field identifier comprises multiple entity reference fields and a leaf field, and wherein the multi-record field identifier is configured to support projections of multiple hops by combining multiple entity reference fields and a leaf field;

identifying, based on the multi-record field identifier, the multiple hops associated with the first data record in response to the search query;

executing a projected field resolution process to segment the multi-record field identifier into a set of components in accordance with a schema associated with the merchant system, wherein each component of the set of components corresponds to a data field of a data record, the segmenting including specifying a struct data type such that the multi-record field identifier includes a set of struct type fields, the struct data type including a subfield and representing a complex structured query language data type that models a data record;

identifying, by the processing device executing a search algorithm against the data value of a leaf component corresponding to the leaf field of the first data record, a second data record and a third data record, wherein the second data record and the third data record are part of a search result in response to the search query based on the multiple hops associated with the first data record; and generating a graphical user interface including the search result, the search results including data values corresponding to the first data record, the second data record and the third data record.

14. The non-transitory computer readable storage medium of claim 13, the operations further comprising receiving, from the merchant system, the schema corresponding to one or more data records associated with the merchant system.

15. The non-transitory computer readable storage medium of claim 13, wherein the projected field resolution process comprises splitting the multi-record field identifier of the projected field into a list of fields using a delimiter in accordance with the schema.

16. The non-transitory computer readable storage medium of claim 13, the operations further comprising:

receiving, from the merchant system, a first indication of a search type to associate with the projected field;

determining the search query corresponds to the search type; and searching the projected field in view of the search query.

17. The non-transitory computer readable storage medium of claim 13, wherein segmenting the multi-record field identifier into a set of components comprises splitting the multi-record field identifier by the search management system.

* * * * *